United States Patent
Okita et al.

(10) Patent No.: US 6,325,867 B1
(45) Date of Patent: Dec. 4, 2001

(54) ROLLING BEARING AND HEAT TREATMENT METHOD THEREFOR

(75) Inventors: Shigeru Okita; Yasuo Utsumi; Akihiro Kiuchi, all of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 08/251,575

(22) Filed: May 31, 1994

(30) Foreign Application Priority Data

May 31, 1993 (JP) .................................. 5-152915

(51) Int. Cl.[7] .................... C23C 8/34; C23C 8/32
(52) U.S. Cl. .............. 148/318; 148/319; 148/226; 148/232; 148/906; 428/610; 428/698; 384/492
(58) Field of Search .................. 148/318, 319, 148/906, 218, 226, 232; 384/482; 428/610, 698

(56) References Cited

U.S. PATENT DOCUMENTS 4,470,854 * 9/1984 Nakamura ..................... 148/318
4,871,268 * 10/1989 Furumura et al. ............. 148/319

FOREIGN PATENT DOCUMENTS

| 4205647 | 8/1993 | (DE) . | |
|---|---|---|---|
| A2234523 | 7/1990 | (GB) | ............... C22C/38/18 |
| A2259714 | 9/1992 | (GB) | ............... C22C/38/00 |
| 62-24499 | 5/1987 | (JP) . | |
| 64-55423 | 3/1989 | (JP) . | |
| 2-34766 | 2/1990 | (JP) . | |
| 03-24257 | * 2/1991 | (JP) . | |
| 3-24258 | 2/1991 | (JP) . | |

OTHER PUBLICATIONS

HTM 47 (1992) 4, S. 223 bis 229.

German Office Action with English translation for application No. P44 19 035.2–24 Nov. 9, 1994.

* cited by examiner

*Primary Examiner*—Sikyin Ip
(74) *Attorney, Agent, or Firm*—Sughrue, Mion, Zinn, Macpeak & Seas, PLLC

(57) ABSTRACT

A rolling bearing contains no more than 0.3 wt % of nitrogen in a grinding allowance portion after carbonitriding and hardening heat treatments, contains from 0.9 wt % (inclusive) up to 1.6 wt % (inclusive) of carbon and from 0.05 wt % (inclusive) up to 0.3 wt % (inclusive) of nitrogen in the surface layer of the finished part and has a nitrogen gradient of no more than 0.5 wt %/mm in the surface layer of the finished part. The rolling bearings are improved in grinding efficiency and which have their rolling life extended significantly.

5 Claims, 10 Drawing Sheets

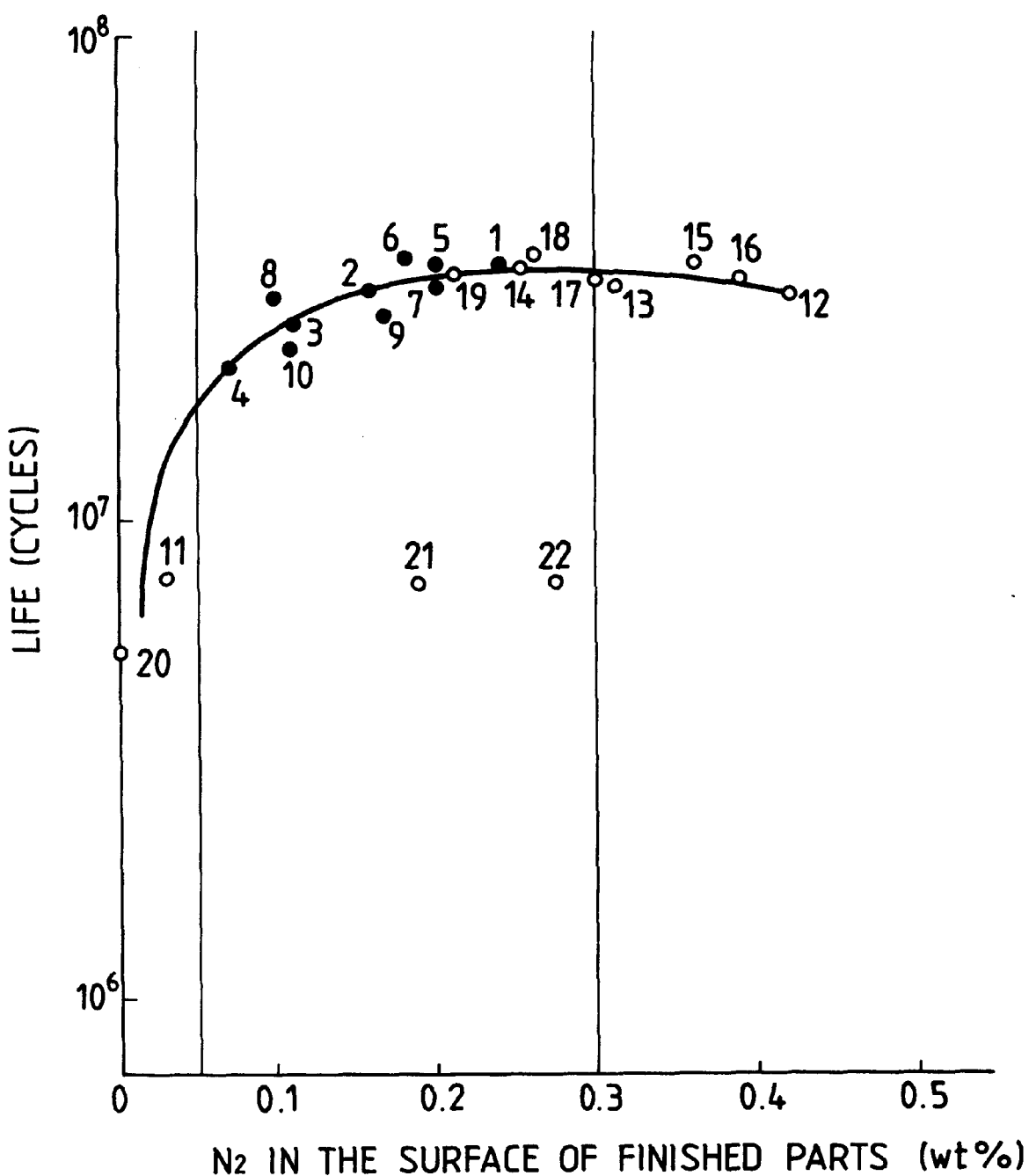

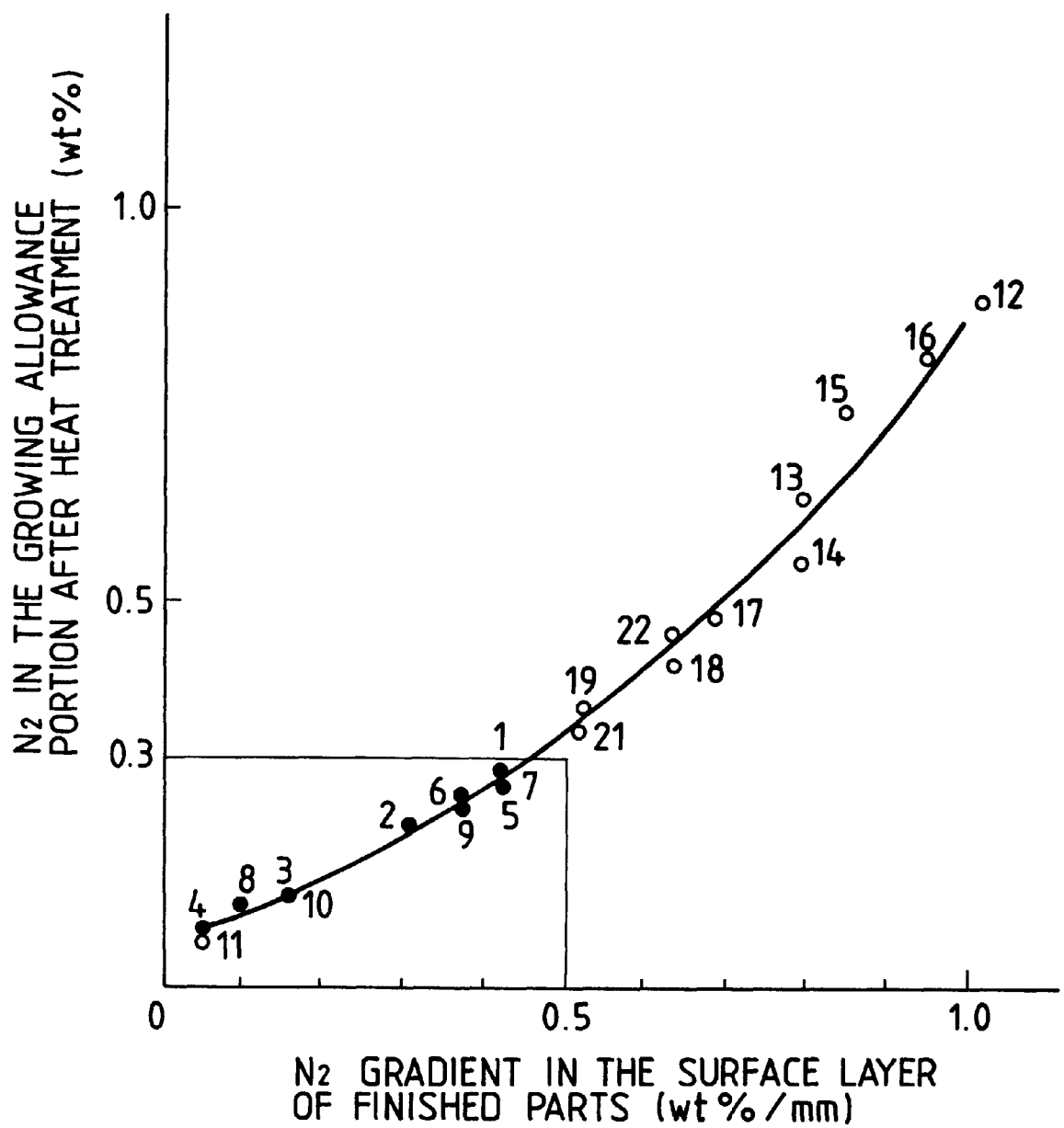

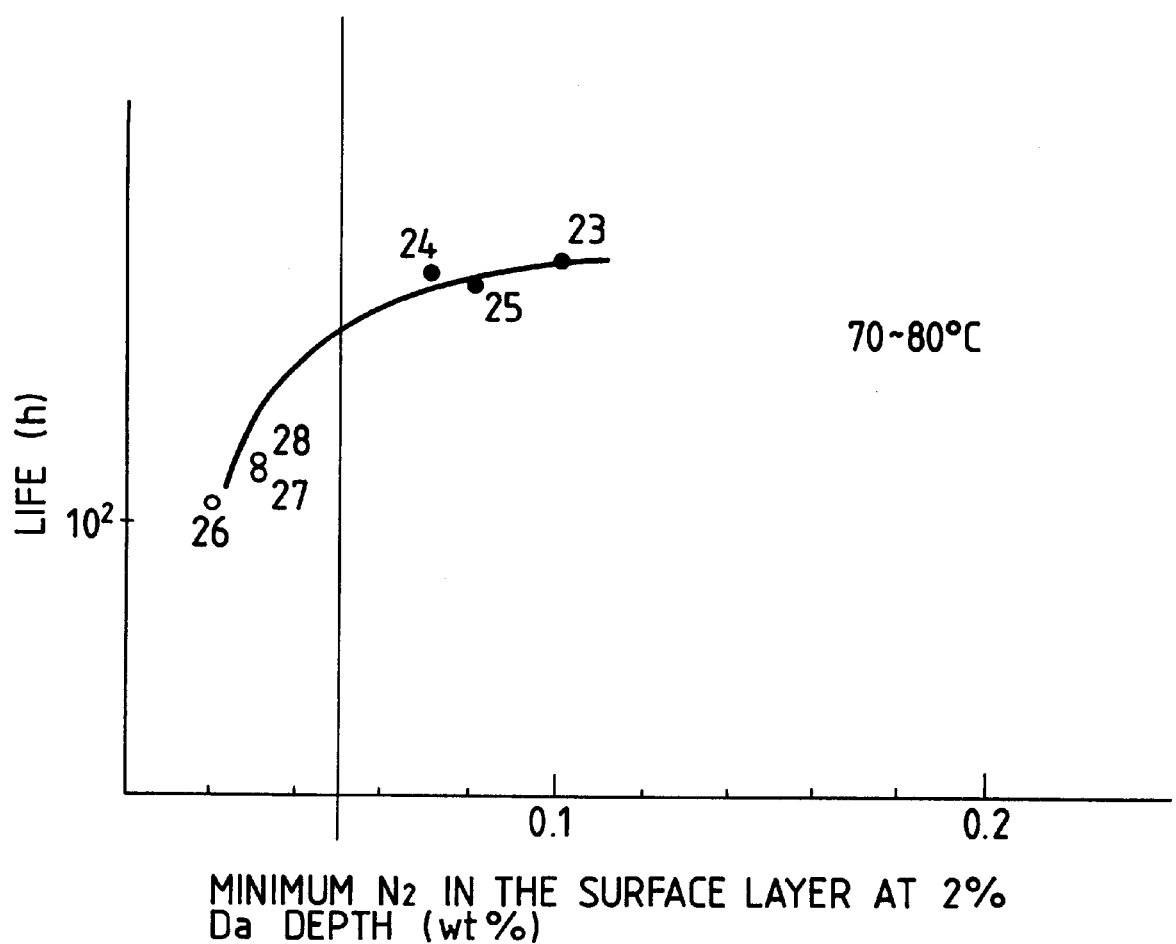

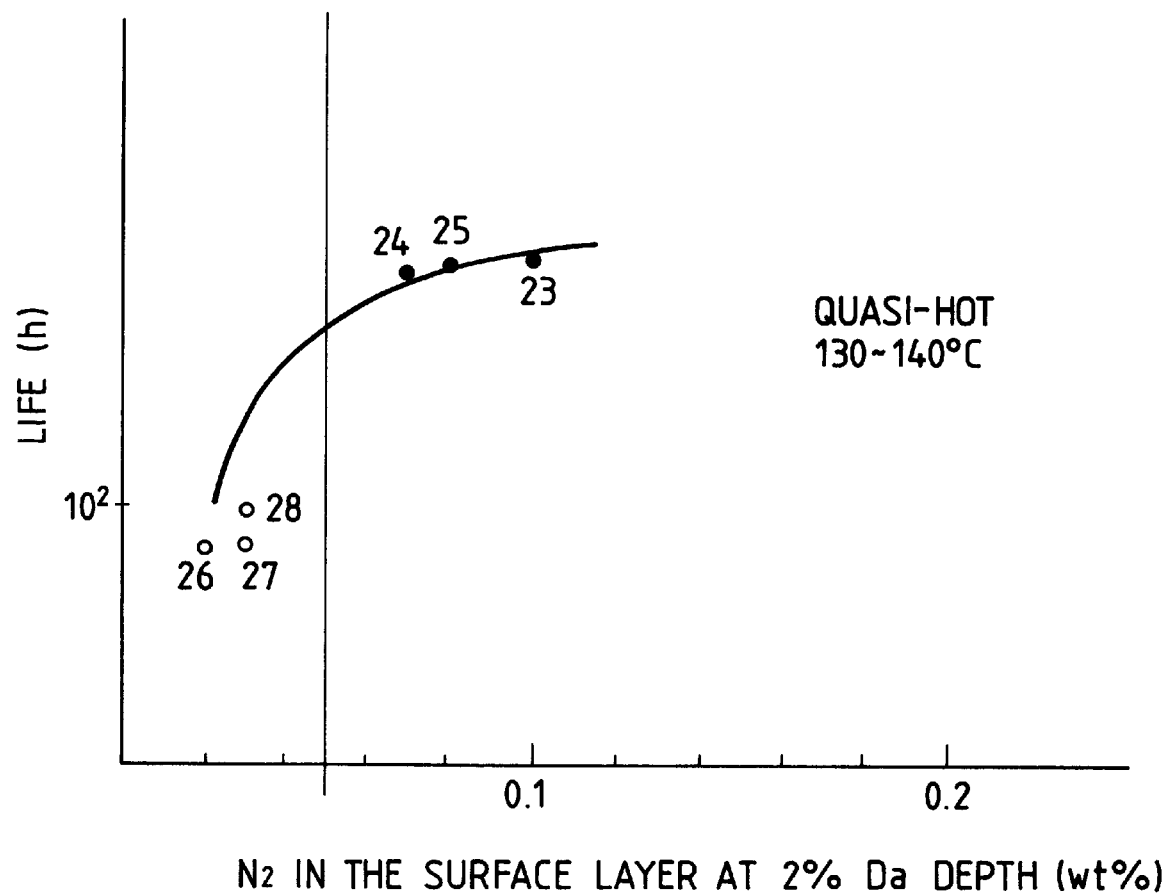

ROLLING BEARING AND HEAT TREATMENT METHOD THEREFOR

BACKGROUND OF THE INVENTION

The present invention relates to a rolling bearing, particularly, to a long-lived rolling bearing that is improved in grinding efficiency and that is suitable for use on transmissions and engines in automobiles, agricultural machines, construction machines, iron and steel machines, etc, and further relates to a heat treatment method for hardening a surface to produce the long-lived rolling bearing.

Rolling bearings are conventionally produced by a processes that typically provides rolling a material of carburizing steel, which is then forged under hot, warm or cold conditions and cut by turning. In order to improve the life of rolling bearings, various surface hardening treatments are performed, such as carbonitriding in the temperature range from 650 to 900° C., followed by oil quenching, or carburizing in the temperature range from 900 to 950° C., followed by carbonitriding in the temperature range from 800 to 860° C., which in turn is followed by oil quenching. These surface hardening treatments contribute to a marked improvement in the temper resistance of the rolling bearing, whereby its resistance to wear and corrosion is sufficiently increased to prolong its life.

Rolling bearings are used in increasingly hostile environments and the demand for extending their life has accordingly become rigorous.

Under the circumstances, Examined Japanese Patent Publication No. Sho. 62-24499 and Unexamined Japanese Patent Publication No. Hei. 2-34766 proposed that a heat treatment such as carburization be performed in such a way as to precipitate spheroidal cutting carbides on the surface of a low to medium carbon, low alloy steel, thereby improving the hardness of the steel surface (the surface of outer and inner races, as well as rolling elements) while extending the life of the rolling bearing.

Rolling bearings are often used under dirty lubricating conditions in the presence of foreign matter. Unexamined Japanese Patent Publication No. Sho. 64-55423 proposes that the content of carbon, the amount of residual austenite ($\gamma_R$ vol %) and the content of carbonitrides in the rolling surface layer of a bearing be adjusted to appropriate values, whereby the stress concentration at the edges of dents formed by the foreign matter is sufficiently reduced to suppress the occurrence of cracking while extending the rolling life of the bearing.

The conventional method described in Examined Japanese Patent Publication No. Sho. 62-24499 and Unexamined Japanese Patent Publication No. Hei. 2-34766 which is directed to the enhancing of the surface hardness of the races and rolling elements is effective in lessening the severity of dents formed by foreign matter. On the other hand, the toughness of the races and rolling elements decreases and cracks propagate from the areas of damage caused by the foreign matter in the lubricating oil; such cracks serve as the start point for early flaking which makes it impossible to achieve satisfactory extension in the life of the bearing.

The conventional method described in Unexamined Japanese Patent Publication No. Sho. 64-55423 is effective in extending the life of a rolling bearing under dirty lubricating conditions due to the presence of an appropriate amount of residual austenite. On the other hand, the residual austenite lowers the surface hardness of the bearing and deteriorates its fatigue resistance. Thus, there still exists the need to establish a more appropriate relationship between the amount of residual austenite ($\gamma_R$ vol %) and the surface hardness (Hv).

Under the circumstances, the present applicant has previously discovered an optimal relationship between the amount of residual austenite ($\gamma_R$ vol) in the rolling surface layer of a rolling bearing and its surface hardness (Hv). Further, the present applicant has proposed a long-lived rolling bearing in which the average particle size of carbides and carbonitrides in the rolling surface layer were adjusted to optimal values, thereby solving the problem of reduced surface hardness due to the presence of residual austenite.

Unexamined Japanese Patent Publication No. Hei. 3-24258 proposed a method providing nitriding a carburizing steel part in the temperature range from 750 to 800° C. and then carburizing the same at a temperature not lower than 900° C. or carbonitriding it at a temperature not lower than 800° C. The nitriding treatment drives nitrogen into the surface layer, thereby increasing the surface nitrogen concentration and the subsequent carburizing treatment allows the nitrogen to diffuse so that it penetrates deep into the surface layer together with carbon, thereby providing a long-lived rolling bearing.

The rolling bearing just described above has been carbonitrided at temperatures in the range from about 650 to about 900° C., which are conventionally referred to as the "common treatment temperatures". However, with such rolling bearing that has been subjected to carbonitriding at the common treatment temperatures, a more-than-necessary large amount of nitrogen is contained in the heat-treated surface layer, so carbonitrides are prone to be precipitated in large amounts and, what is more, such excess nitrogen will contribute to unduly improved resistance to tempering and war. As another problem, residual austenite which is present in a more-than-necessary large amount lowers the grinding machinability of bearings. Thus, the method proposed in Unexamined Japanese Patent Publication No. Hei. 3-24258 has not given due consideration to the grinding machinability problem.

A further problem with the carbonitriding and nitriding treatments under discussion is that since they are performed at lower temperatures than ordinary carburizing treatments, an unduly long time is taken to produce a hardened layer of the same nature as the one that is produced by carburization; as a result, the productivity drops but the initial cost increases.

It should also be mentioned that the carbonitriding treatment performed at the aforementioned temperature takes so much time that carbonitrides tend to become coarse in structure in the flow direction of material and serve as the start point for the propagation of cracks, thereby lowering the fatigue life of the final product.

SUMMARY OF THE INVENTION

The present invention has been accomplished under these circumstances and has as an object providing a rolling bearing that is improved in grinding efficiency and which yet features a significantly prolonged rolling fatigue life.

This object of the present invention can be attained by a rolling bearing that is made from an alloy steel containing 0.1 wt % up to 1.2 wt % of carbon and subjected to carbonitriding and hardening heat treatments, followed by grinding a grinding allowance portion, the rolling bearing is characterized in that at least one of ground finished component parts of the rolling bearing in a surface layer, provides carbon in a range from 0.9 wt % up to 1.6 wt % and nitrogen in a range from 0.05 wt % up to 0.3 wt %, and in that a nitrogen gradient in the surface layer does not exceed 0.5 wt %/mm.

The term "surface layer" as used herein means the depth as measured from the surface of an as-ground finished part to the point corresponding to 2%,of the diameter of a rolling element Da where a maximum shear stress develops (the depth of said point is hereunder referred to as "2% Da depth"). The term "nitrogen gradient" means the rate of change in the concentration of nitrogen (wt %) in the surface layer as measured in the depth direction; the nitrogen gradient, expressed in wt %/mm, is defined by:

{(the concentration of nitrogen in the surface of a finished part)−
(the concentration of nitrogen at 2% Da depth)}/2% Da depth.

To produce the rolling bearing of the present invention, the carbonitriding treatment is advantageously performed by either one of the following schemes: it is performed at a temperature in excess of 900° C.; or it is first performed at a temperature not exceeding 900° C. and then replaced by a diffusion treatment or it is first performed at a temperature not exceeding 900° C. and then at a temperature in excess of 900° C.

The rolling bearing of the present invention is adapted to contain no more than 0.3 wt % of nitrogen in the grinding allowance portion that has been subjected to the carbonitriding and hardening heat treatments and, hence, nitrogen will not be contained in a more-than-necessary large amount in the grinding allowance portion. Thus, the resistance of the bearing to tempering and wear will not be unduly improved by excess nitrogen and, instead, its grinding machinability is reasonably enhanced.

The bearing as a finished part contains from 0.05 wt % (inclusive) up to 0.3 wt % (inclusive) of nitrogen in the surface layer and this insures that fine-grained carbides can be produced by the carbonitriding treatment without precipitating coarse particles. Consequently, the rolling fatigue life of the bearing is improved significantly.

BRIEF DESCRIPTION OF THE DRAWINGS

In the accompanying drawings:

FIG. 6 is a graph showing the relationship between the nitrogen content (wt %) in the surface layer of finished parts of the samples prepared in the examples of the present invention and the rolling life ($L_{10}$) of those samples;

FIG. 7 is a graph showing the relationship between the nitrogen gradient (wt %/mm) in the surface layer of finished parts of the samples prepared in the examples of the present invention and the nitrogen content (wt %) in the grinding allowance portion;

FIG. 11 is a graph showing the relationship between the nitrogen content (wt %) in the depth position corresponding to 2% of the average diameter of rolling elements in a rolling bearing (as a finished part) and its rolling life ($L_{10}$) under clean lubricating conditions; and FIG. 12 is a graph showing the relationship between the nitrogen content (wt %) in the depth position corresponding to 2% of the average diameter of rolling elements in a rolling bearing (as a finished part) and its rolling life ($L_{10}$) under quasi-hot clean lubricating conditions.

DETAILED DESCRIPTION OF THE PREFERRED EMBODIMENTS

Figure 1:
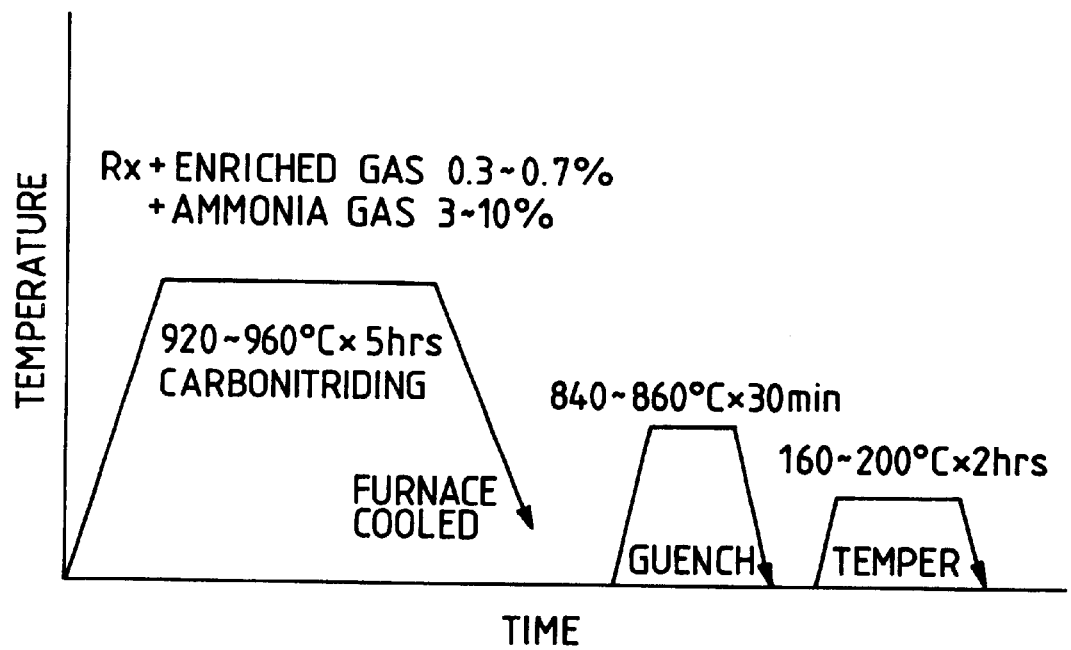
FIG. 1 is a chart showing the thermal history of a heat treatment conducted in examples of the present invention.

There will be described hereinbelow embodiments of a rolling bearing according to the present invention with reference to the accompanying drawings.

The feature of the present invention specifies contents of various elements of which the rolling bearing is composed. The contents of carbon and nitrogen in the rolling bearing and its nitrogen gradient which is the concentration gradient of nitrogen in the depth direction are described below in regard their criticality and other aspects.

Carbon Content in Core Material:

At Least 0.1 wt % but Not Exceeding 1.2 wt %

In order for a rolling bearing to attain the necessary hardness ($\geq 60$ in HRC), its surface layer must contain at least 0.6 wt % of carbon. If the core material (the bearing material) which is to be surface hardened by carbonitriding contains less than 0.1 wt % of carbon, the time of carbonitriding treatment will be prolonged even if it is performed in accordance with the present invention as described hereinafter, so that the cost for manufacturing is increased while lowering the productivity. In addition, the core material has such a low hardness that it will undergo plastic deformation, thereby shortening the life of the rolling bearing.

If the carbon content of core material exceeds 1.2 wt %, a special pretreatment is necessary before the above-described carbonitriding treatment is performed; otherwise, macrocarbides such as $Fe_3C_7$ and $Cr_3C$ will be precipitated in the steel making process. It should also be noted that such macrocarbides are prone to precipitate even after the carbonitriding treatment and they serve as the start point for crack propagation, which eventually leads to a very short life of the rolling bearing. As a further problem, less carbon and nitrogen will enter the material during carbonitriding and the proportions of these elements which dissolve in the matrix will decrease to produce a nonuniform solid solution, which becomes a source of stress concentration, thereby shortening the rolling life of the bearing.

Hence, the carbon content of core material is limited to lie within the range from 0.1 wt % (inclusive) up to 1.2 wt % (inclusive).

Nitroaen Contained in the Grinding Allowance Portion After Carbonitriding and Hardening Heat Treatments:

No More Than 0.3 wt %

As is well known, if carbonitriding is performed at temperatures in the range from about 650 to about 900° C. which are generally referred to as the "common treatment temperatures", nitrogen will be contained in a more-than-necessary large amount in the grinding allowance portion after carbonitriding and hardening heat treatments. As a result, carbonitrides are prone to precipitate in the grinding allowance portion and the nitrogen contained in that the grinding allowance portion will enhance the resistance to tempering and wear so much as to deteriorate the grinding machinability of the material.

One can therefore see that by limiting the amount of nitrogen that is contained in the grinding allowance portion after carbonitriding and hardening heat treatments, the deterioration in grinding machinability due to the presence of excess nitrogen can be suppressed.

Based on this observation, the present inventors investigated how the grinding machinability of the material would deteriorate on account of the nitrogen contained in the grinding allowance portion. The investigation was conducted by the following method.

Samples equivalent to the inner race surface of rolling bearing that had nitrogen contents of 0 to 1.0 wt % in the grinding allowance portion that was subjected to carbonitriding and hardening heat treatments were ground with a grinding wheel and examination was made as to how the grinding wheel lost its shape and became loaded at various values of nitrogen content. At the same time, the number of sample pieces that could be ground before the dressing of the grinding wheel became necessary was checked. The investigation was conducted under the following conditions.

| | |
|---|---|
| Grinding wheel | WA100 |
| Grinding fluid | Soluble type |
| Peripheral grinding speed | 2800 to 3000 m/min |

Figure 9:
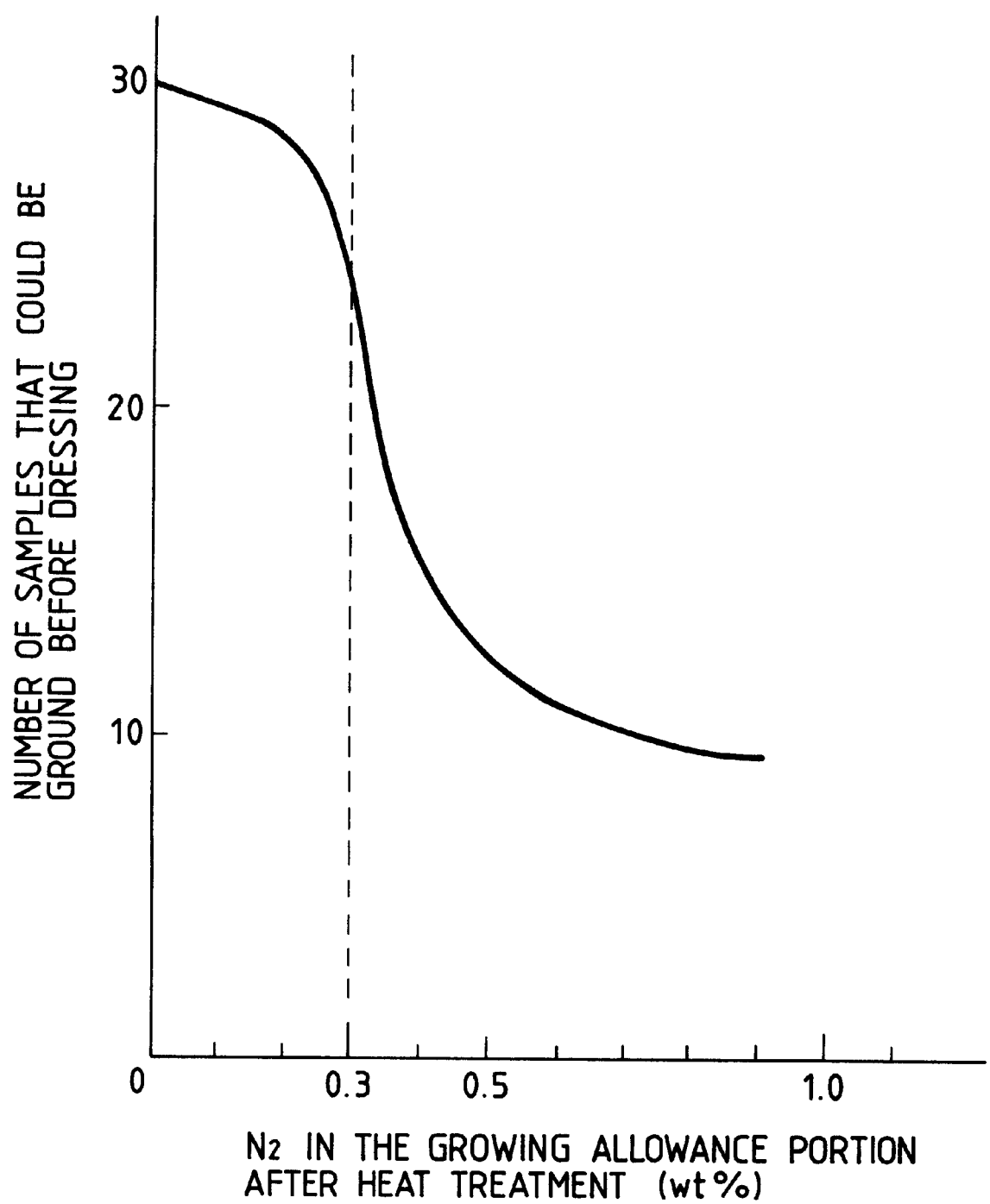
FIG. 9 is a graph showing the relationship between the nitrogen content (wt %) in the grinding allowance portion of rolling bearing and the number of pieces that could be ground before the dressing of the grinding wheel became necessary.

The results are shown in FIG. 9.

FIG. 9 verifies that if the nitrogen content in the grinding allowance portion is 0.3 wt % and less, the number of sample pieces that can be ground before the dressing of the grinding wheel becomes necessary is increased markedly, which means a significant improvement in the grinding machinability of the material. Hence, the amount of nitrogen contained in the grinding allowance portion after carbonitriding and hardening heat treatments is limited to no more than 0.3 wt % in the present invention.

FIG. 9 also verifies that the grinding machinability of the material can be further improved by insuring that the amount of nitrogen contained in the grinding allowance portion after carbonitriding and hardening treatments is adjusted to no more than 0.25 wt %. Hence, the amount of nitrogen contained in the grinding allowance portion after carbonitriding and hardening heat treatments is more preferably adjusted to 0.25 wt % and less.

Carbon Contained in the Surface Layer of Finished Parts After Carbonitriding and Hardening Heat Treatments:

At Least 0.9 wt % but Not Exceeding 1.6 wt %

In order to extend the life of the finished parts of a rolling bearing, it is necessary that the surface hardness of the finished parts satisfy an optimal relationship with the amount of residual austenite.

If the content of carbon in the surface layer of the finished parts of the bearing that has been subjected to carbonitriding and hardening heat treatments is less than 0.9 wt % they will not be able to exhibit satisfactory surface hardness (Hv) and difficulty is encountered in extending therein life.

On the other hand, if the carbon content in the surface layer of the finished parts of the bearing after the carbonitriding and hardening heat treatments exceeds 1.6 wt %, macrocarbides such as $Fe_3C_7$ and $Cr_3C$ will be precipitated in the finished parts of the bearing and they will become the start point for crack propagation, which eventually leads to a very short life of the finished parts.

Hence, the content of carbon in the surface layer of the finished parts of the rolling bearing after carbonitriding and hardening heat treatments is limited to lie within the range from 0.9 wt % (inclusive) to 1.6 wt % (inclusive) in the present invention.

Nitroaen Content in the Surface Layer of Finished Part:

At Least 0.05 wt % but Not Exceeding 0.3 wt %

The surface of the finished parts of a rolling bearing that has been finish ground after carbonitriding and hardening heat treatments is required to contain the necessary amount of nitrogen for extending the rolling life of the bearing.

The present inventors investigated the relationship between the nitrogen Content in the surface layer of the finished parts of the bearing and their rolling life by the following method.

Samples were prepared in such a way that the nitrogen content in the surface layer of the finished parts of a rolling bearing varied over the range from 0 to 0.6 wt %. Ten samples were provided for each level of nitrogen content and each of them was subjected to a rolling life test under dirty lubricating conditions using a thrust bearing steel life tester of the type described on pages 10 to 21 of "Tokushuko Binran (Handbook of Specialty Steels)", First Ed., complied by Denki Seiko Kenkyusho and published by Rikogakusha, May 25, 1969. Weibull plots were constructed by investigating the cumulative stress cycles (life) up to the occurrence of flaking in the respective samples and the $L_{10}$ life of each sample was determined from the profiles of the respective Weibull distributions. The test conditions were as follows.

| | |
|---|---|
| Rolling element diameter Da | 9.5 mm (2% Da = 0.18 mm) |
| Pmax (areal pressure) | 4900 MPa |
| Number of rotations | 3000 cpm |
| Lubricating oil | turbine oil #68 |
| Contaminant | |
| Nature | $Fe_3C$ base powder |
| Hardness | HRC 52 |
| Grain size | 74 to 147 $\mu$m |
| Content | 300 ppm in lube oil |

Figure 10:
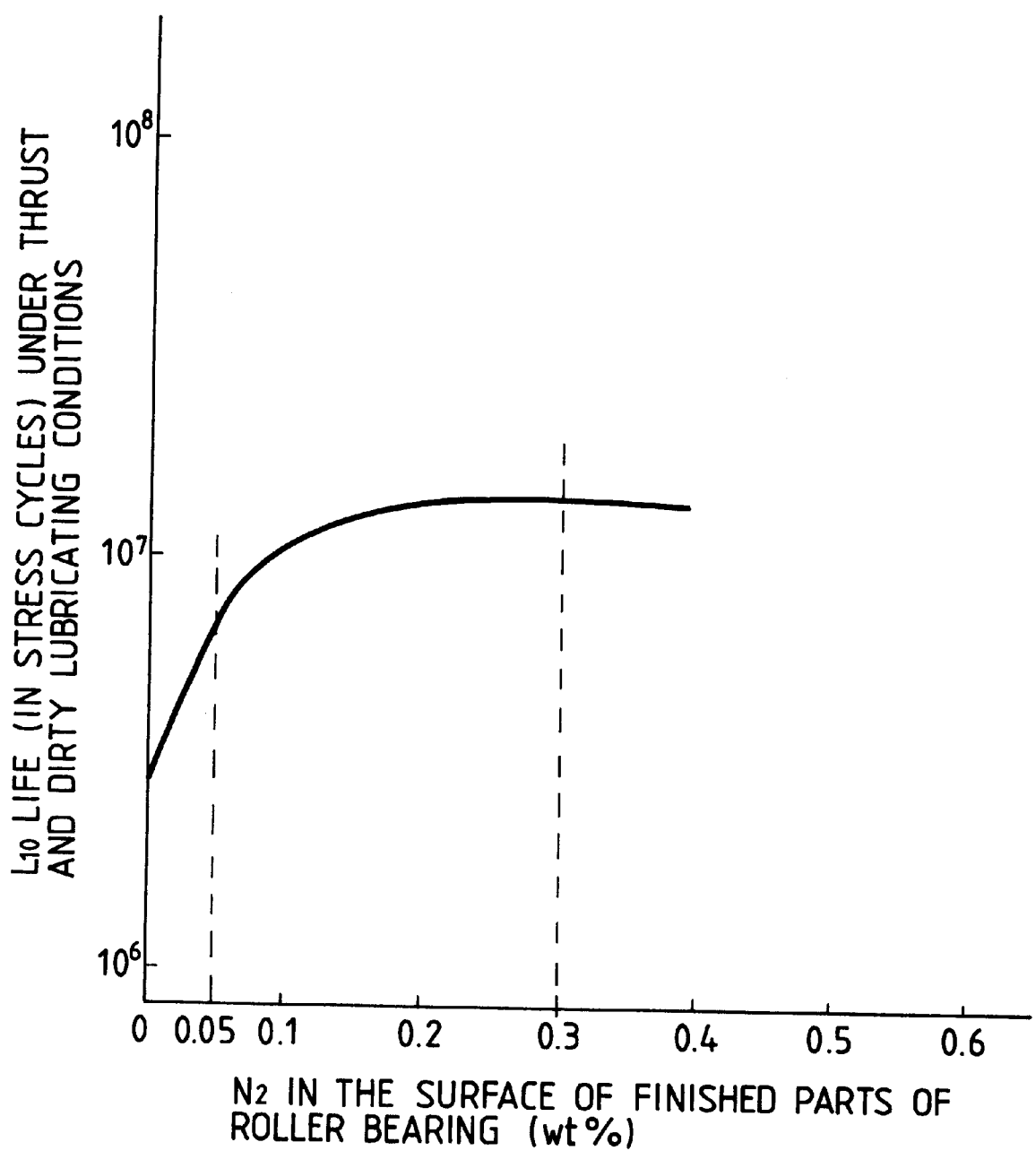
FIG. 10 is a graph showing the relationship between the nitrogen content (wt %) in the surface layer of a rolling bearing (as a finished part) and its rolling life ($L_{10}$)

The results are shown in FIG. 10.

FIG. 10 verifies that if the nitrogen content in the surface layer of the finished parts of a rolling bearing is less than 0.05 wt %, the dissolution of nitrogen is insufficient to produce fine-grained carbonitrides, whereby the rolling life of the bearing ($L_{10}$ life) is shortened drastically.

With large-seize bearings, the value of 2% Da depth where maximum shear stress develops is great (namely, the surface layer is deep). Like small ones, large-size bearings also require that an appropriate amount of nitrogen be contained in the surface layer in order to extend the rolling life. Therefore, it is necessary that large-size bearings have deeper nitrogen penetration than small ones.

Under dirty lubricating conditions, the amount of residual austenite in the rolling surface and its hardness (nitrogen content) have predominant effects on the rolling fatigue life of the bearing; under clean or quasi-hot clean lubricating conditions, the hardness and nitrogen content in the position of maximum shear stress are also influential.

Under the circumstances, the present inventors selected a cylindrical rolling bearing NU220 (o.d., 180; i.d., 100; width, 34) as a large-size bearing and investigated the relationship between the nitrogen content of finished parts of the bearing (at 2% Da depth) and their rolling life under clean and quasi-hot clean lubricating conditions. The investigation was conducted by the following method.

The above-described method of $L_{10}$ life determination was employed, except that the following test conditions were adopted with a radial bearing endurance tester of NSK Ltd. The $L_{10}$ life was expressed in hr.

For Clean Lubrication:

| | |
|---|---|
| Rolling element diameter Da | 20 mm (2% Da = 0.4 mm) |
| Pmax (areal pressure) | 2500 MPa |
| Number of rotations | 1500 rpm |
| Lubricating oil | turbine oil #68 |
| Oil temperature | 70 to 80° C. |

For Quasi-hot Clean Lubrication:

| | |
|---|---|
| Rolling element diameter Da | 20 mm (2% Da = 0.4 mm) |
| Pmax (areal pressure) | 2500 MPa |
| Number of rotations | 1500 rpm |
| Lubricating oil | turbine oil #150 |
| Oil temperature | 130 to 140° C. |

The results are shown in FIGS. 11 and 12, respectively.

FIG. 11 verifies that if the nitrogen content at 2% Da depth is less than 0.05 wt %, the rolling fatigue life of the bearing drops. This is because the dissolution of nitrogen is insufficient to achieve satisfactory temper resistance and produce fine-grained carbonitrides in adequate amounts.

FIG. 12 verifies that in a quasi-hot atmosphere somewhat hotter than temperatures where bearings are typically used, the rolling fatigue life of the bearing deteriorates further if the nitrogen content at 2% Da depth is less than 0.05 wt %.

It should also be noted that with samples whose nitrogen content in the surface layer of finished parts exceeds 3 wt %, the amount of nitrogen contained in the grinding allowance portion after the carbonitriding and hardening heat treatments in accordance with the present invention exceeds 0.3 wt %, making it difficult to achieve an improvement in the grinding machinability of the material.

Therefore, the content of nitrogen in the surface layer of the finished parts of the rolling bearing is limited to lie within the range from 0.05 wt % (inclusive) up to 0.3 wt % (inclusive).

Nitrogen Qradient in the Surface Layer of Finished Parts:
No More Than 0.5 wt %/mm In order to hold the nitrogen content in the grinding allowance portion to 0.3 wt % and below, a special carbonitriding heat treatment is performed according to the schemes as described hereinafter. As a result, the concentration gradients of carbon and nitrogen, in particular, the concentration gradient of nitrogen in the depth direction tends to decrease not only in the grinding allowance portion but also in the surface layer of finished parts. This is because the special carbonitriding treatment permits nitrogen to diffuse from the surface deep into the bulk of the material.

FIG. 7 shows relationship between the nitrogen gradient in the surface layer of finished parts of a bearing and the nitrogen content in the grinding allowance portion (in wt % for maximum value). FIG. 7 verifies that if the nitrogen gradient in the surface layer of finished parts exceeds 0.5 wt %, the nitrogen content in the grinding allowance portion exceeds 0.3 wt %.

Therefore, the nitrogen gradient in the surface layer of finished parts is limited not to exceed 0.5 wt %/mm. Considering the grinding machinability of the material, the nitrogen gradient in the surface layer of finished parts is preferably held to 0.4 wt %/mn and less.

With some samples of large-size bearing, the nitrogen content in the grinding allowance portion exceeded 0.3 wt % and the life was short and yet the nitrogen gradient in the surface layer of finished parts was not more than 0.5 wt %/mm (see Table 2 described hereinafter). However, those samples did not satisfy the condition for the nitrogen content in the surface layer of finished parts to lie within the range from 0.05 to 0.3 wt % (equivalent to less than 0.05 wt % at 2% Da depth).

Similarly, with some samples of small-size bearing, the nitrogen content in the grinding allowance portion exceeded 0.3 wt % and yet the nitrogen content in the surface layer of finished parts satisfied the condition that it should lie within the range from 0.05 to 0.3 wt % (see Table 1 described hereinafter). However, those samples did not satisfy the condition for the nitrogen gradient to be 0.5 wt %/mm and less.

One may therefore conclude that bearings ranging from small sizes to comparatively large sizes can enjoy both good grinding machinability and high rolling endurance if the two conditions set forth above are satisfied at the same time.

There is described in bellow the heat treatments to be performed in accordance with the present invention.

Carbonitriding:

To extend the life of a rolling bearing, the amount of residual austenite ($\gamma_R$ vol %) is adjusted to an optimal value (say, 25 to 45 vol %) in the carburization treatment. Furthermore, in order to compensate for the drop in surface hardness due to the presence of residual austenite, the carburized material is then direct-quenched and subsequently subjected to secondary quench.

However, according to this method, more carbon is dissolved in the matrix and less carbon is available for the formation of carbides; hence, the production of carbides is reduced, making it difficult to attain the necessary surface hardness. If carburization is effected at an increased carbon concentration, macrocarbides will then form to provide the start point for crack propagation.

In the carbonitriding treatment, both carbon and nitrogen are dissolved in the matrix and, therefore, even if the amount of carbon dissolution in the matrix is reduced by the amount of nitrogen dissolution, the surface hardness that can be attained is comparable to that achieved by the carburization treatment. Accordingly, the carbon concentration can be made smaller than when carburization is effected and this effectively suppresses the formation of macrocarbides.

As a further advantage, the carbonitrides that are produced by carbonitriding are more fine-grained than the carbides produced by carburization and, hence, will prove to be effective in extending the life of the rolling bearings.

Therefore, the carbonitriding treatment rather than carburization is adopted in the present invention.

The carbonitriding treatment may be performed by either one of the following schemes: it is performed at a temperature in excess of 900° C.; or it is first performed at a temperature not exceeding 900° C. and then replaced by a diffusion treatment; or it is first performed at a temperature not exceeding 900° C. and then at a temperature in excess of 900° C. In either way, the nitrogen content in the grinding allowance portion and that in the surface layer of the finished parts of the bearing can easily be adjusted to the optimal values. Detailed reasons for this effect are described below.

Temperature for the Carbonitriding Treatment: In Excess of 900° C.

Ammonia used in the carbonitriding treatment is decomposed by a fairly high percentage even at the common carbonitriding temperatures and as reported by "Netsushori (Heat Treatment)", Vol. 8, No. 6 (Japan Association of Heat Treatment Technology, December 1968), p. 404 or "Nihon Kinzoku Gakkaishi 26" (complied by The Japan Institute of Metals, 1962), p. 91, nitrogen sometimes becomes almost undetectable at temperatures in excess of 900° C.

However, the present inventors found that when carbonitriding was performed at temperatures in excess of 900° C. in accordance with the present invention, the nitrogen content in the grinding allowance portion could be adjusted to lie within the range from 0.1 wt % (inclusive) up to 0.3 wt % (inclusive).

In the conventional carbonitriding treatment, the nitrogen content in the grinding allowance portion became so high as to deteriorate the grinding machinability of the material. However, when carbonitriding was performed at temperatures in excess of 900° C. in accordance with the invention, one could obtain a nitrogen concentration profile that was substantially uniform from the surface of the grinding allowance portion to the depth corresponding to the surface of finished parts.

The carbonitriding treatment conducted in accordance with the present invention has another advantage in that it is capable of producing a deeper hardened layer than the carbonitriding treatment conducted at the common temperatures. Further, there will be produced no coarse carbonitrides in the flow direction of the material and this contributes much to the purpose of extending the rolling life of the bearing.

In accordance with the present invention, carbonitriding is more preferably performed at temperatures in excess of 900° C. but less than 980° C.

If the carbonitriding temperature is 900° C. and less, the optimal nitrogen content in the grinding allowance portion cannot be attained unless a diffusion treatment is effected after the carbonitriding treatment but then the overall treatment time is unduly prolonged.

If the carbonitriding temperature is 980° C. and above, it becomes difficult to provide the necessary nitrogen content for achieving high resistance to tempering and wear. What is more, very large furnace equipment is necessary.

Hence, the carbonitriding treatment in accordance with the present invention is preferably conducted at temperatures in excess of 900° C., more preferably at temperatures in excess of 900° C. but less than 980° C.

This method is most advantageous since it can be applied not only to the manufacture of small-size bearings but also to that of comparatively large bearings.

Carbonitriding Treatment is First Performed at Temperatures not Exceeding 900° C. and then Replaced by a Diffusion Treatments:

If carbonitriding is performed at the common temperatures ($\leq 900°$ C.), the nitrogen content in the grinding allowance portion will increase to deteriorate the grinding machinability of the material. To avoid this problem, the supply of ammonia gas may be stopped (but the supply of an enriched gas is not) in the course of carbonitriding treatment and the nitrogen contained in the grinding allowance portion is caused to diffuse at the common carbonitriding temperatures, whereby the nitrogen content of that area is sufficiently reduced to provide a nitrogen concentration profile that is substantially uniform from the surface of that area to the depth corresponding to the surface of finished parts.

In the scheme described above, carbonitriding is performed more advantageously at temperatures in the range from 850° C. (inclusive) up to 900° C. (inclusive). If the carbonitriding temperature is less than 850° C., carbon will not get into the matrix efficiently and the penetration of nitrogen will increase to prolong the diffusion time.

Therefore, it is advantageous to perform carbonitriding first at temperatures not higher than 900° C., preferably in the range from 850° C. to 900° C., which is then replaced by a diffusion treatment.

This scheme of carbonitriding treatment is effective in producing comparatively small-sized rolling bearings that satisfy both requirements for long rolling life and good grinding machinability.

Carbonitriding Treatment is First Performed at Temperatures not Higher than 900° C. and then at Temperatures in Excess of 900° C.:

In its third scheme, carbonitriding is accomplished to some extent at the common temperatures for the carbonitriding treatment ($\leq 900°$ C.), with the temperature being then elevated to higher than 900° C. This is effective in lowering the nitrogen potential by a sufficient degree to enable the diffusion of nitrogen that has entered the grinding allowance portion. As a result, one can produce a nitrogen concentration profile that is substantially uniform from the surface layer of the grinding allowance portion to the depth corresponding to the surface of finished parts. In this case, too, the first stage of the carbonitriding treatment is performed advantageously at temperatures in the range from 850 to 900° C. for the reason set forth above in connection with the second scheme.

The third scheme of the carbonitriding treatment is capable of producing substantially the same results as the first scheme.

Quenching Treatment:

In accordance with the present invention, quenching (hardening heat treatment) follows the various schemes of carbonitriding treatment described above and this quenching treatment is advantageously performed in the following manner.

Conventionally, the carbonitriding treatment is performed for the primary purpose of either improving the quenchability, or achieving the solid-solution hardening by carbon and nitrogen; hence, carbon and nitrogen need only to be present at sufficient levels to attain these two purposes. This is why the carbonitriding treatment is followed by direct quenching.

However, if direct quenching follows the carbonitriding treatment that is performed at elevated temperatures according to the schemes of the invention, the crystal grains will become coarse due to prolonged heating and the mechanical strength of the material will decrease. Further, carbon will dissolve in a more-than-necessary large amount in core material, whereby the amount of residual austenite will increase to potentially impair the dimensional stability of the final product.

Under the circumstances, the present invention performs quenching and tempering after the carbonitriding treatment by first lowering the temperature from the carbonitriding temperature down to below the $A_1$ transformation point (723° C.), then heating above the $A_1$ transformation point (quench temperature), and holding the same temperature. Thus, secondary quench is performed not only to refine the crystal grains but also to hold the content of residual austenite in core material at low level. The amount of residual austenite can be adjusted to an appropriate level by proper selection of the secondary quench temperature.

It should be noted here that if the carbon level of material is no more than 0.5 wt %, direct quench may be performed after the carbonitriding treatment because the core material of low hardness is capable of not only preventing the drop in mechanical strength but also holding the amount of residual austenite in core material at low level. As already mentioned, carbonitriding can be conducted in accordance with the present invention to produce an appropriate amount of residual austenite in the surface layer with low nitrogen content; therefore, from an economic viewpoint, it is preferable to use material having a carbon level of no more than 0.5 wt % and perform either direct quenching or step quenching in which the temperature is slightly lowered from the carbonitriding temperature to a temperature above the $A_1$ transformation point, where the material is held and thereafter subjected to direct quench.

The term "surface layer" as used herein means the area extending from the surface of ground finished parts down to a desired depth which, for the purposes of the present invention, is 2% Da depth corresponding to 2% of the average diameter of rolling elements at which a Maximum shear stress develops.

EXAMPLES

The following examples are provided for the purpose of further illustrating the present invention but are in no way to be taken as limiting.

Common case hardening steels (SCR 440 and 420) and bearing steel (SUJ 2) were used as material (bearing materials) and subjected to the various heat treatments described below. For the specific kinds of heat treatment that were applied to the individual material samples, see Table 1.

Heat Treatment A

As shown in FIG. 1, carbonitriding was performed at temperatures of 940 to 960° C. in an Rx gas atmosphere for. 5 h with the concentrations of an enriched gas and ammonia gas being varied over the ranges 0.3 to 0.7% and 3 to 10%, respectively. Thereafter, samples were left to cool to room temperature, held at 840 to 860° C. for 30 min, quenched (subjected to a hardening heat treatment) and subsequently tempered at 160 to 200° C. for 2 h.

Heat Treatment B

As shown in FIG. 1, carbonitriding was performed at temperatures of 920 to 940° C. in an Rx gas atmosphere for 5 h with the concentrations of an enriched gas and ammonia gas being varied over the ranges 0.3 to 0.7% and 3 to 10%, respectively. Thereafter, samples were left to cool to room temperature, reheated and held at 840 to 860° C. for 30 min, quenched (subjected to a hardening heat treatment) and subsequently tempered at 160 to 200° C. for 2 h.

Heat Treatment BX

Figure 4:
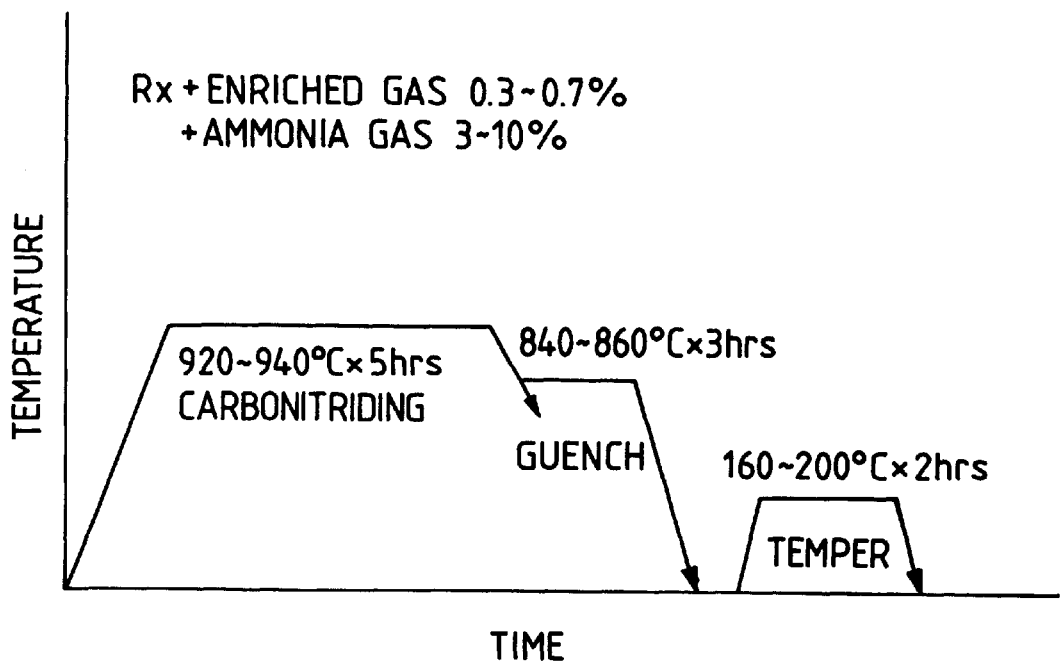
FIG. 4 is a chart showing the thermal history of yet another heat treatment conducted in the examples of the present invention.

As shown in FIG. 4, carbonitriding was performed at temperatures of 920 to 940° C. in an Rx gas atmosphere for 5 h with the concentrations of an enriched gas and ammonia gas being varied over the ranges 0.3 to 0.7% and 3 to 10%, respectively. Thereafter, samples were held at 840 to 860° C. for 30 min, quenched (subjected to a hardening heat treatment) and subsequently tempered at 160 to 200° C. for 2 h.

Heat Treatment C

Figure 2:
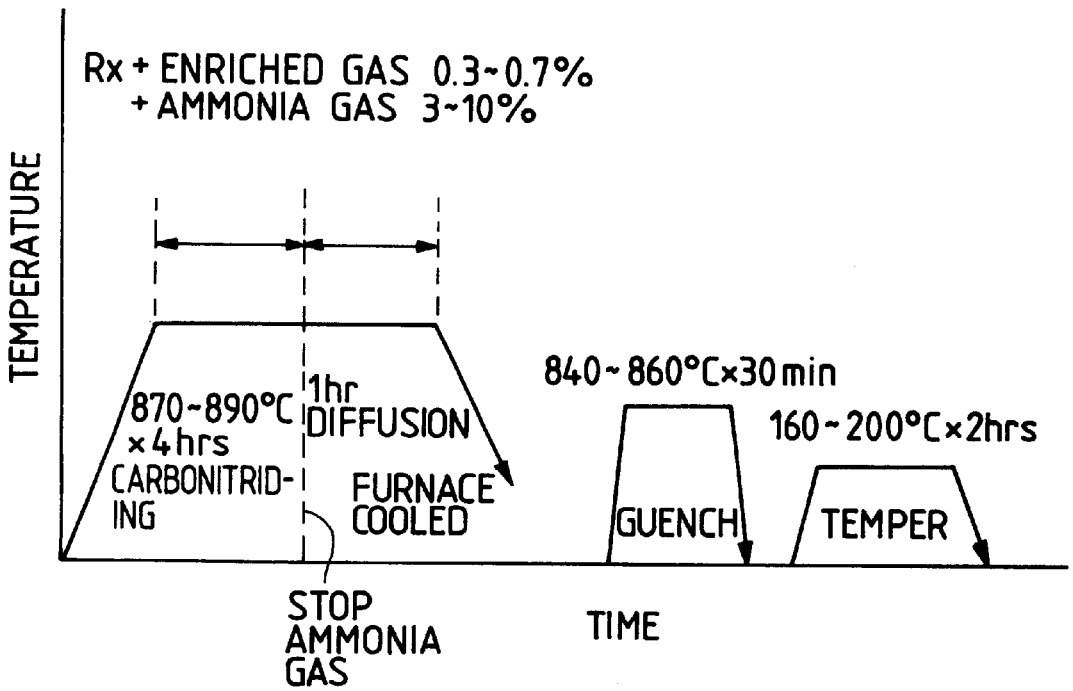
FIG. 2 is a chart showing the thermal history of another heat treatment conducted in the examples of the present invention.

As shown in FIG. 2, carbonitriding was performed at temperatures of 870 to 890° C. in an Rx gas atmosphere for 4 h with the concentrations of an enriched gas and ammonia gas being varied over the ranges 0.3 to 0.7% and 3 to 10%, respectively. Then, only the supply of ammonia gas was stopped but the other process conditions remained the same and a diffusion treatment was conducted for 1 h. Thereafter, samples were left to cool to room temperature, reheated and held at 840 to 860° C. for 30 min, quenched (subjected to a hardening heat treatment) and subsequently tempered at 160 to 200° C. for 2 h.

Heat Treatment D

Figure 3:
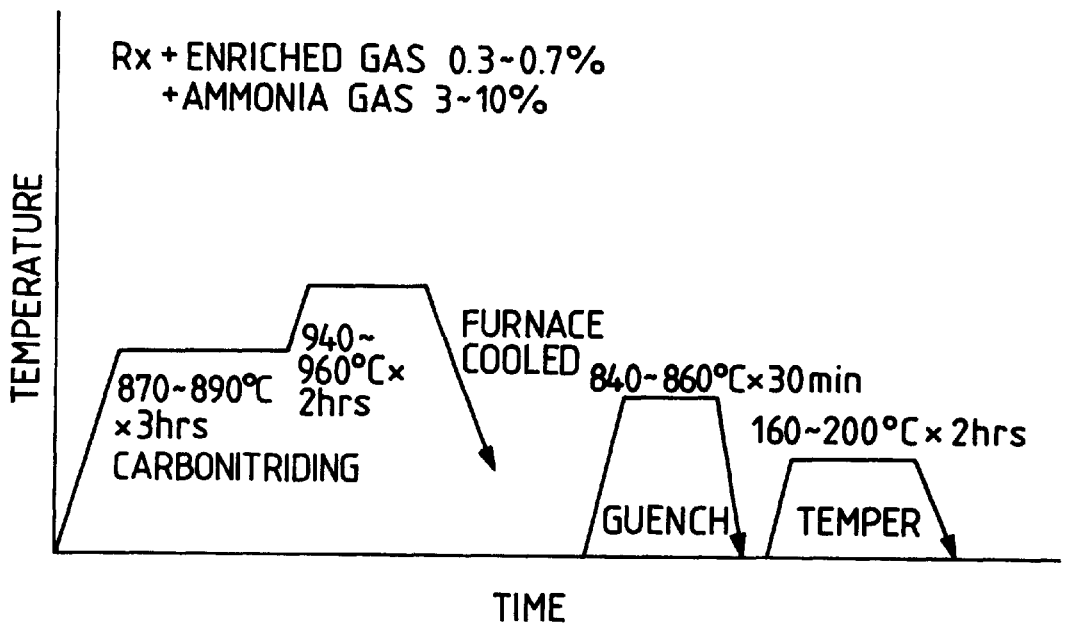
FIG. 3 is a chart showing the thermal history of still another heat treatment conducted in the examples of the present invention.

As shown in FIG. 3, carbonitriding was performed at temperatures of 870 to 890° C. in an Rx gas atmosphere for 3 h with the concentrations of an enriched gas and ammonia gas being varied over the ranges 0.3 to 0.7% and 3 to 10%, respectively. Then, only the temperature was raised to 940 to 960° C. and carbonitriding was continued for 2 h. Thereafter, samples were left to cool to room temperature, reheated and held at 840 to 860° C. for 30 min, quenched (subjected to a hardening heat treatment) and subsequently tempered at 160 to 200° C. for 2 h.

Heat Treatment B

Carbonitriding was performed at temperatures of 840 to 860° C. in an Rx gas atmosphere for 5 h with the concentrations of an enriched gas and ammonia gas being varied over the ranges 0.3 to 0.7% and 3 to 10%, respectively. Thereafter, samples were left to cool to room temperature, reheated and held at 840 to 860° C. for 30 min, quenched (subjected to a hardening heat treatment) and subsequently tempered at 160 to 200° C. for 2 h.

Heat Treatment F

Carbonitriding was performed at temperatures of 860 to 880° C. in an Rx gas atmosphere for 5 h with the concentrations of an enriched gas and ammonia gas being varied over the ranges 0.3 to 0.7% and 3 to 10%, respectively. Thereafter, samples were left to cool to room temperature, reheated and held at 840 to 860° C. for 30 min, quenched (subjected to a hardening heat treatment) and subsequently tempered at 160 to 200° C. for 2 h.

Heat Treatment G

Carbonitriding was performed at temperatures of 870 to 890° C. in an Rx gas atmosphere for 5 h with the concentrations of an enriched gas and amonia gas being varied over the ranges 0.3 to 0.7% and 3 to 10%, respectively. Thereafter, samples were left to cool to room temperature, reheated and held at 840 to 860° C. for 30 min, quenched (subjected to a hardening heat treatment) and subsequently tempered at 160 to 200° C. for 2 h.

Heat Treatment H

Conventional carburization was performed at temperatures of 920 to 940° C. for 5 h. Thereafter, samples were left to cool to room temperature, reheated and held at 840 to 860° C. for 30 min, quenched (subjected to a hardening heat treatment) and tempered at 160 to 200° C. for 2 h.

Heat Treatment AX

Carbonitriding was performed at temperatures of 980 to 990° C. in an Rx gas atmosphere for 5 h with the concentrations of an enriched gas and ammonia gas being varied over the ranges 0.3 to 0.7% and 3 to 10%, respectively. Thereafter, samples were left to cool to room temperature, reheated and held at 840 to 860° C. for 30 min, quenched (subjected to a hardening heat treatment) and subsequently tempered at 160 to 200° C. for 2 h.

TABLE 1

| Sample No. | Steel species | Heat treatment | N (%) in grinding allowance portion | Surface layer of finished parts | | | | $L_{10}$ life (× 10⁶) | Number of pieces that could be ground before dressing |
|---|---|---|---|---|---|---|---|---|---|
| | | | | C (%) in surface | N (%) in surface | N (%) at 2% Da | ΔN/2% Da (%/mm) | | |
| Example 1 | SCR440 | A | 0.28 | 1.16 | 0.24 | 0.16 | 0.42 | 33.4 | 26 |
| Example 2 | SCR440 | A | 0.21 | 1.21 | 0.16 | 0.10 | 0.31 | 29.7 | 28 |
| Example 3 | SCR440 | B | 0.13 | 1.32 | 0.11 | 0.08 | 0.16 | 25.2 | 29 |
| Example 4 | SCR440 | BX | 0.08 | 1.36 | 0.07 | 0.06 | 0.05 | 20.4 | 29 |
| Example 5 | SUJ2 | B | 0.26 | 1.48 | 0.20 | 0.12 | 0.42 | 33.1 | 27 |
| Example 6 | SCR420 | B | 0.25 | 1.18 | 0.18 | 0.11 | 0.37 | 35.8 | 27 |
| Example 7 | SCR440 | C | 0.27 | 1.25 | 0.20 | 0.12 | 0.42 | 30.6 | 26 |
| Example 8 | SCR440 | C | 0.11 | 1.30 | 0.10 | 0.08 | 0.10 | 28.5 | 29 |
| Example 9 | SCR440 | D | 0.24 | 1.27 | 0.17 | 0.10 | 0.37 | 26.3 | 28 |
| Example 10 | SCR440 | D | 0.12 | 1.35 | 0.11 | 0.08 | 0.16 | 22.6 | 28 |
| Comparative Example 11 | SCR440 | AX | 0.06 | 1.41 | 0.03 | 0.02 | 0.05 | 7.5 | 29 |
| Comparative Example 12 | SCR440 | E | 0.88 | 1.12 | 0.42 | 0.22 | 1.05 | 28.3 | 9 |
| Comparative Example 13 | SCR440 | E | 0.63 | 1.16 | 0.31 | 0.16 | 0.79 | 29.8 | 10 |
| Comparative Example 14 | SUJ2 | E | 0.55 | 1.39 | 0.25 | 0.10 | 0.79 | 33.4 | 11 |
| Comparative Example 15 | SCR420 | E | 0.74 | 1.11 | 0.36 | 0.20 | 0.84 | 32.7 | 10 |
| Comparative Example 16 | SCR440 | F | 0.81 | 1.21 | 0.39 | 0.21 | 0.94 | 30.2 | 9 |
| Comparative Example 17 | SCR440 | F | 0.48 | 1.27 | 0.30 | 0.17 | 0.68 | 31.6 | 13 |
| Comparative Example 18 | SCR440 | G | 0.42 | 1.22 | 0.26 | 0.14 | 0.63 | 35.5 | 14 |
| Comparative Example 19 | SCR440 | G | 0.36 | 1.36 | 0.21 | 0.11 | 0.52 | 31.5 | 17 |
| Comparative Example 20 | SCR440 | H | — | 1.03 | — | — | — | 5.3 | 29 |
| Comparative Example 21 | SUJ2 | G | 0.34 | 1.69 | 0.19 | 0.09 | 0.52 | 6.8 | 18 |
| Comparative Example 22 | SCR420 | G | 0.45 | 0.88 | 0.27 | 0.15 | 0.63 | 7.1 | 13 |

The samples (sample Nos. 1 to 22) that were subjected to the heat treatments described above were investigated for the nitrogen content (wt %) in the grinding allowance portion, the carbon content in the surface layer of finished parts, the nitrogen content (wt %) in the surface layer of surface layer of finished parts and the nitrogen content (wt %) in the grinding allowance portion.

The data obtained with the cylindrical rolling bearing which is described hereinabove under "Effects" are given in Table 2.

TABLE 2

| Sample No. | Steel species | Heat treatment | N (%) in grinding allowance portion | Surface layer of finished parts | | | | $L_{10}$ life (h) under clean conditions | $L_{10}$ life (h) under quasi-hot clean conditions |
|---|---|---|---|---|---|---|---|---|---|
| | | | | C (%) in surface | N (%) in surface | N (%) at 2% Da | ΔN/2% Da (%/mm) | | |
| Example 23 | SCR440 | A | 0.28 | 1.05 | 0.16 | 0.10 | 0.15 | 327 | 312 |
| Example 24 | SCR440 | B | 0.15 | 1.10 | 0.11 | 0.07 | 0.10 | 316 | 303 |
| Example 25 | SCR440 | D | 0.22 | 1.08 | 0.13 | 0.08 | 0.13 | 302 | 308 |
| Comparative Example 26 | SCR440 | E | 0.74 | 1.03 | 0.23 | 0.02 | 0.53 | 118 | 84 |
| Comparative Example 27 | SCR440 | F | 0.65 | 1.07 | 0.20 | 0.03 | 0.43 | 126 | 85 |
| Comparative Example 28 | SCR440 | G | 0.53 | 1.09 | 0.19 | 0.03 | 0.40 | 131 | 99 | finished parts (both in the surface and at 2% Da depth), the nitrogen gradient in the surface layer (wt %/mm), as well as the rolling life ($L_{10}$) and the number of sample pieces that could be ground before the dressing of the grinding wheel became necessary. The last two parameters were investigated by the methods already described hereinabove under "Effects".

Figure 5:
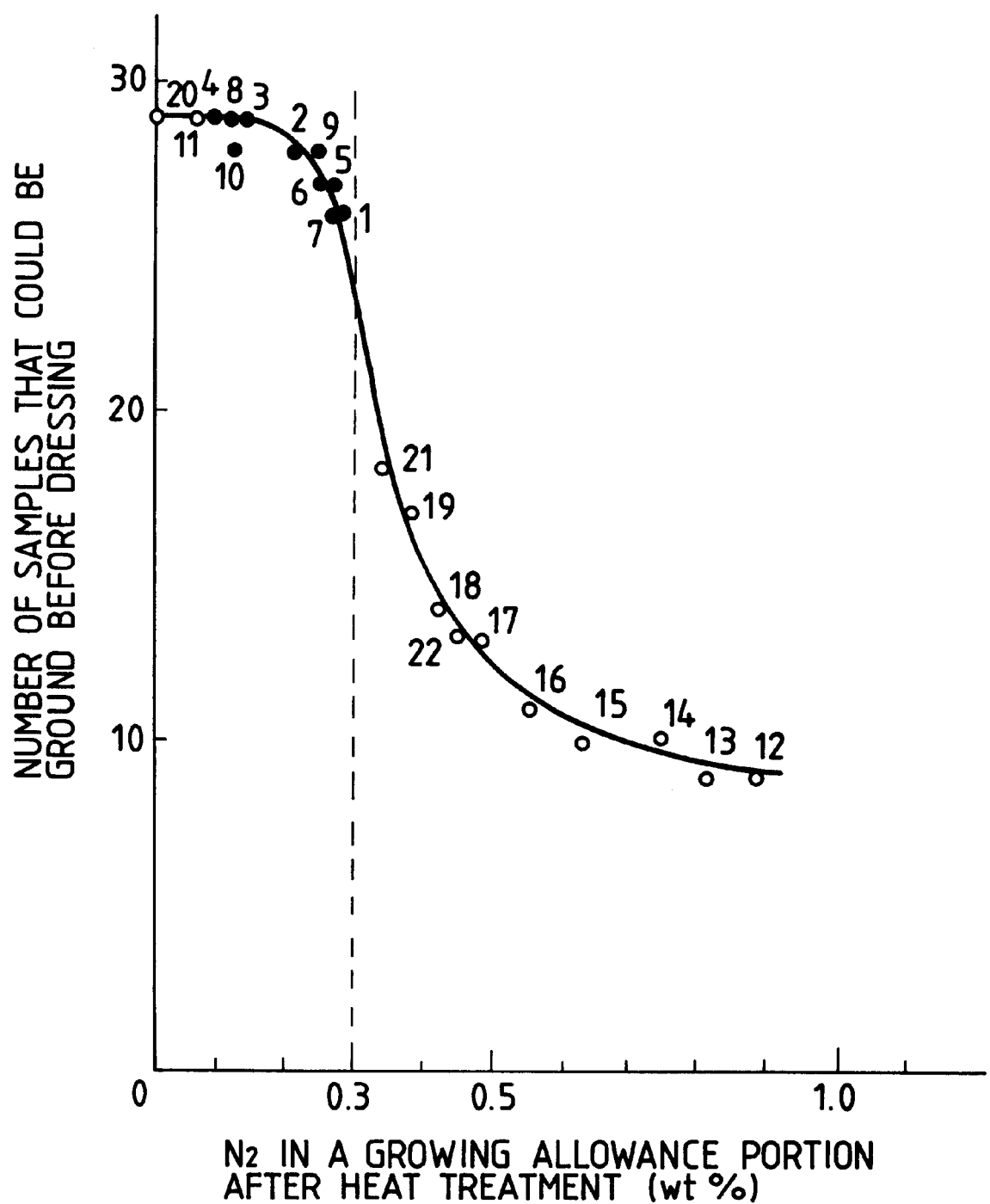
FIG. 5 is a graph showing the relationship between the nitrogen content (wt %) in a grinding allowance portion of samples prepared in the examples of the present invention and the number of pieces that could be ground until the dressing of the grinding wheel became necessary.

The results of these investigations are shown in Table 1. FIG. 5 shows graphically the relationship between the nitrogen content (wt %) in the grinding allowance portion of each sample and the number of pieces that could be ground before the dressing of the grinding wheel became necessary; FIG. 6 shows graphically the relationship between the nitrogen content (wt %) in the surface layer of finished parts of bearing and its rolling life ($L_{10}$); FIG. 7 shows graphically the relationship between the nitrogen content (wt %) in the As one can verify from Table 1 and FIG. 5, the samples whose nitrogen content in the grinding allowance portion was no more than 0.3 wt % had good grinding machinability as evidenced by the fact that at least 26 pieces could be ground before the dressing of the grinding wheel became necessary; on the other hand, the samples whose nitrogen content in the grinding allowance portion exceeded 0.3 wt % had their grinding machinability deteriorated markedly since the number of pieces that could be ground before dressing was very small. These results demonstrated that the grinding machinability of the rolling bearing could be improved by adjusting the nitrogen content in the grinding allowance portion to 0.3 wt % and less.

One can also verify from Tables 1 and 2, as well as FIGS. 6, 11 and 12 that excepting sample Nos. 21 and 22, those samples whose nitrogen content in the surface layer of finished parts was at least 0.05 wt % had far longer rolling lives ($L_{10}$) than the samples whose nitrogen content in the surface layer of finished parts was less than 0.05 wt %. On the other hand, the samples whose nitrogen content in the surface layer of finished parts exceeded 0.3 wt % are not acceptable since the amount of nitrogen contained in the grinding allowance portion after carbonitriding and hardening heat treatments were conducted in accordance with the present invention exceeded 0.3 wt % to do harm to the purpose of improving the grinding machinability of the rolling bearing.

Sample No. 21 contained at least 0.05 wt % of nitrogen in the surface layer of finished parts and yet its rolling life was short; this is because the carbon content in the surface layer of finished parts exceeded 1.6 wt %, causing the precipitation of macrocarbides which were deleterious to the rolling life of bearing.

Sample No. 22 also had a short rolling life and this is because the carbon content in the surface layer of finished parts was less than 0.9 wt % and insufficient to insure adequate surface hardness for the bearing.

Tables 1 and 2, as well as FIG. 7 further verify that the samples whose nitrogen content in the grinding allowance portion was no more than 0.3 wt % had nitrogen gradients of 0.5 wt %/mm and less in the surface layer of finished parts.

It was verified that sample Nos. 1 to 10 and 23 to 25 had received heat treatments according to either one of the schemes specified by the present invention (A, B, BX, C or D).

Sample No. 11 satisfied the condition for nitrogen gradient and featured a long dressing interval; however, its nitrogen content was so small that the rolling life was short. This is because the carbonitriding temperature adopted in heat treatment AX to which the sample was subjected was as high as 980 to 990° C.

Conversely, several samples (Nos. 14, 17 to 19, 21 and 22) had carbon contents of more than 0.3 wt % in the grinding allowance portion although their nitrogen content in the surface layer of finished parts was within the range 0.05 to 0.3 wt %; as a matter of fact, these samples had nitrogen gradients of more than 0.5 wt %/mm in the surface layer of finished parts. Even when the nitrogen gradient in the surface layer of finished parts was not more than 0.5 wt %/mm sample Nos. 27 and 28 has nitrogen contents of more than 0.3 wt % in the grinding allowance portion and their rolling life was short; the nitrogen content at 2% Da depth was less than 0.05 wt % in these samples. One may therefore conclude with good reason that in order for the objects of the present invention to be attained, the conditions for the nitrogen content and nitrogen gradient in the surface layer of finished parts must be satisfied at the same time.

Thus, the foregoing data demonstrate that sample Nos. 1 to 10 and 23 to 25 which satisfied the following conditions were markedly improved in terms of grinding machinability an rolling life: that the amount of nitrogen contained in the grinding allowance portion after carbonitriding and hardening heat treatments should be no more than 0.3 wt %; that the carbon content in the surface layer of finished parts should be within the range from 0.9 wt % (inclusive) up to 1.6 wt % (inclusive); that the nitrogen content in the surface layer of finished parts should be within the range from 0.05 wt % (inclusive) up to 0.3 wt % (inclusive); and that the nitrogen gradient in the surface layer of finished parts should be no more than 0.5 wt %/mm.

To be discussed next are typical examples of the metallurgical structure in the neighborhood of the surface layer of a rolling bearing according to the present invention (one of the samples subjected to heat treatment A) and conventional rolling bearings, each being as heat treated (but yet to be machined by grinding).

Figure 8A:
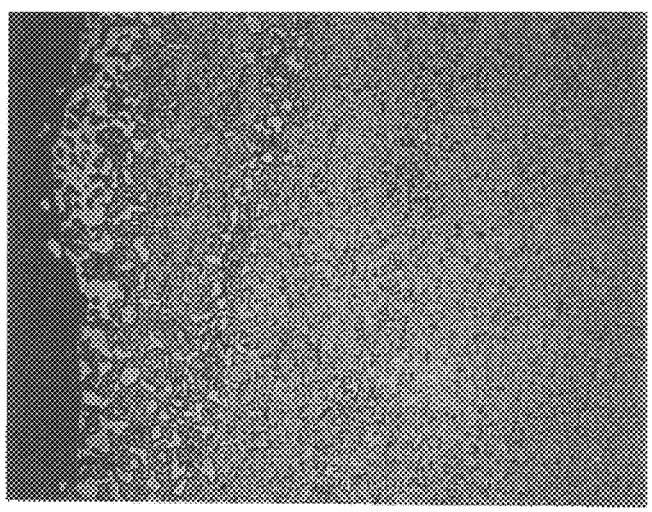
FIGS. 8(A) and 8(B) are micrographs showing the metallurgical structure in the neighborhood of the surface layer of conventional rolling bearings.
Figure 8B:
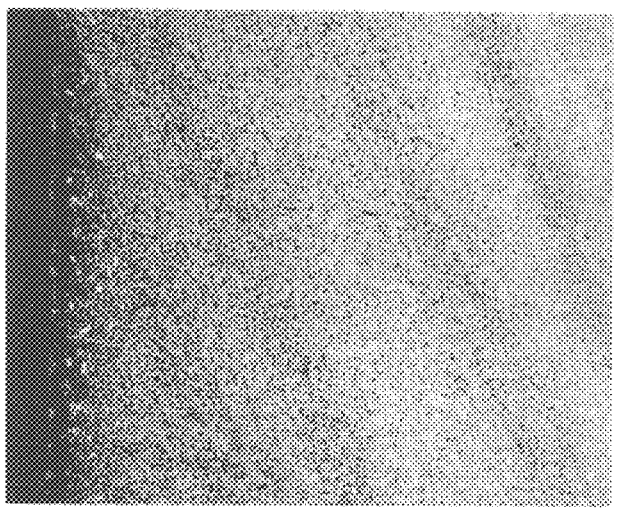
Figure 8C:
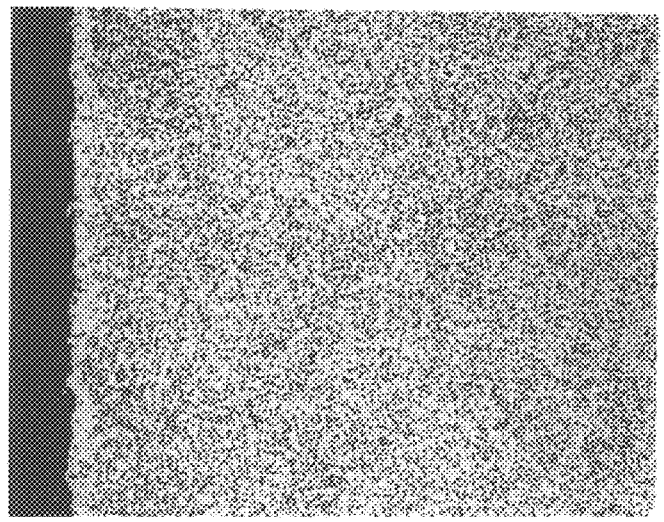
FIG. 8(C) is a micrograph showing the metallurgical structure in the neighborhood of the surface layer of a rolling bearing according to the present invention.

FIGS. 8(A) and 8(B) are micrographs showing the metallurgical structure in the neighborhood of the surface layer of sample Nos. 13 and 18, respectively, which are listed in Table 1 as the conventional rolling bearings; FIG. 8(C) in a micrograph showing the metallurgical structure in the neighborhood of the surface layer of sample No. 1 according to the present invention.

One can verify the following from FIGS. 8(A) to 8(B): depending on the conditions of carbonitriding treatment, the conventional rolling bearings are characterized by marked coarsening of carbonitride grains in the neighborhood of the surface layer; on the other hand, the rolling bearing according to the present invention is substantially free from any detectable coarsening of carbonitride grains and there is no localization of nitrogen in the neighborhood of the surface layer. Hence, the present invention not only provides fine-grained carbonitrides which contribute to the extension of bearing's life but also insures the manufacture of rolling bearings that feature good grinding machinability.

In the examples described above, SCR 440, SCR 420 and SUJ 2 are used as material; it should, however, be noted that these are not the sole examples of the bearing materials that can be used in the present invention, and other steel species such as SUJ 3 and SUJ 4 can also be used as long as they contain from 0.1 wt % (inclusive) up to 1.2 wt % (inclusive) of carbon in the core and which permit the manufacture of rolling bearings.

Since chromium and silicon tend to promote the dissolution of nitrogen and, if contained in large amounts, they will deteriorate the grindability of material after carbonitriding. Therefore, the chromium content is preferably held to 3 wt % or less, and the silicon content to 1.0 wt % or less.

The description of the examples is directed to the rolling bearing in which the concept of the present invention is applied to at least one of component parts, i.e., the outer race, the inner race and the rolling elements. In the present invention, the member that rolls relative to the rolling elements is not at all limited to either the outer or inner race of the bearing. The present invention can be applied to other members of the component parts that roll relative to the rolling elements, such as the housing, shaft, nuts and screws.

As described above, the rolling bearing of the present invention contains no more than 0.3 wt % of nitrogen in the grinding allowance portion after carbonitriding and hardening heat treatments, contains from 0.9 wt % (inclusive) up to 1.6 wt % (inclusive) of carbon and from 0.05 wt % (inclusive) up to 0.3 wt % (inclusive) of nitrogen in the surface layer of finished parts and has a nitrogen gradient of no more than 0.5 wt %/mm in said surface layer. Since nitrogen is not contained in the grinding allowance portion in a more-than-necessary large amount, there is no possibility that excess nitrogen will cause either more-than-necessary improvement in resistance to tempering and wear or undue formation of residual austenite. As a further advantage, the carbonitriding treatment as performed in accordance with the present invention contributes to the formation of fine-grained carbides and an appropriate mount of residual austenite without causing the precipitation of macrocarbonitrides. Consequently, the present invention achieves marked improvements in terms of the grinding machinability and the rolling life of bearings.

What is claimed is:
1. A rolling bearing comprising components of an inner race, an outer race and a plurality of rolling elements, at least one of the components being made from an alloy steel comprising 0.1 wt % up to 1.2 wt % of carbon and the balance being Fe, the one of the components having a hardened layer with a grinding allowance portion after being subjected to carbonitriding and hardening heat treatments, followed by grinding the grinding allowance portion to obtain a finished component part having a surface layer which removes the grinding allowance portion from the hardened layer, wherein said surface layer comprises:

carbon in a range from 0.9 wt % up to 1.6 wt %;

nitrogen in a range from 0.05 wt % up to 0.3 wt %;

said nitrogen content being at least 0.05 wt % at a depth of 2% of a diameter of the finished component part inwardly from a surface of the surface layer; and a nitrogen gradient, which is the rate of change in the concentration of nitrogen in the depth direction of said surface layer, not exceeding 0.5 wt %/mm.

2. The rolling bearing of claim 1, wherein the amount of nitrogen contained in said grinding allowance portion after carbonitriding and hardening heat treatments is limited to no more than 0.3 wt %.

3. The rolling bearing of claim 1, wherein said carbonitriding treatment is selected from the group consisting of:

(a) carbonitriding at a temperature in excess of 900° C. and not more than 980° C.;

(b) carbonitriding at a temperature not exceeding 900° C. and then performing a diffusion treatment; and (c) carbonitriding at a temperature not exceeding 900° C. and then carbonitriding at a temperature in excess of 900° C.

4. The rolling bearing of claim 1, wherein after said carbonitriding treatment is performed at a carbonitriding temperature range, said hardening heat treatment includes quenching and tempering treatments carried out at a hardening temperature range to which the rolling bearing is reheated after being lowered to room temperature from the carbonitriding temperature range.

5. The rolling bearing of claim 1, wherein after said carbonitriding treatment is performed at a carbonitriding temperature range, said hardening heat treatment includes quenching and tempering treatments carried out at a hardening temperature range directly lowered from the hardening temperature range.

* * * * *